United States Patent
Griepentrog

(10) Patent No.: US 6,285,401 B1
(45) Date of Patent: Sep. 4, 2001

(54) APPARATUS FOR SUPPRESSING OVERSHOOTS IN KINESCOPE BEAM CURRENT MEASUREMENT PULSES

(75) Inventor: Dal Frank Griepentrog, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/223,159

(22) Filed: Dec. 30, 1998

Related U.S. Application Data

(60) Provisional application No. 60/094,338, filed on Jul. 28, 1998, and provisional application No. 60/108,277, filed on Nov. 12, 1998.

(51) Int. Cl.$^7$ .................................................. H04N 5/68
(52) U.S. Cl. .................... 348/380; 348/379; 348/377; 315/382.1; 315/383
(58) Field of Search ................................. 348/380, 379, 348/377, 305, 378; 315/382, 382.1, 383

(56) References Cited

U.S. PATENT DOCUMENTS

| | | | |
|---|---|---|---|
| 4,017,681 | * | 4/1977 | Smeulers et al. ............... 348/380 |
| 4,536,800 | * | 8/1985 | Parker ........................... 348/379 |
| 4,549,203 | * | 10/1985 | Shanley, II .................... 348/692 |
| 4,591,912 | * | 5/1986 | Belotserkovsky et al. ...... 348/625 |
| 4,694,350 | * | 9/1987 | Hinn .............................. 348/379 |
| 5,177,413 | * | 1/1993 | Wilber ........................... 315/383 |
| 5,680,173 | * | 10/1997 | White et al. ................... 348/380 |

* cited by examiner

Primary Examiner—Reinhard J. Eisenzopf
Assistant Examiner—Trang U. Tran
(74) Attorney, Agent, or Firm—Joseph S. Tripoli; Paul P. Kiel

(57) ABSTRACT

Display apparatus includes a kinescope cathode current sensor (18) coupled to a load (200) for developing a beam current measurement pulse during a beam current measurement interval. Overshoots in the pulses are suppressed by a pulse correction circuit (300) comprising a first capacitor (Ca) coupled from the load circuit (200) to a source of reference potential (Gr) via a switch (Q300); and a control circuit (Ca, Ra, Rb), responsive to the presence of the overshoot, for closing the switch for a predetermined length of time and for opening the switch otherwise. In an advantageous implementation of the pulse correction circuit the switch comprises a bipolar transistor (Q300) having an emitter (E) coupled to the source of reference potential (Gr) and having a collector (C) AC coupled to the load circuit (200) via the first capacitor (Ca); and the control circuit comprises a second capacitor (Cb) for AC coupling said load circuit to a base (B) of the bipolar transistor and a resistor (Ra) for DC coupling said base (B) to said source of reference potential (Gr). In an alternative irrplementation of the pulse correction circuit the switch comprises a field effect transistor (300A) provided with a gate (G) to drain (D) bypass diode (D1).

10 Claims, 4 Drawing Sheets

APPARATUS FOR SUPPRESSING OVERSHOOTS IN KINESCOPE BEAM CURRENT MEASUREMENT PULSES

RELATED APPLICATIONS

This application claims the benefits of U.S. Provisional Application Ser. No. 60/094,338 filed Jul. 28, 1998 and of U.S. Provisional Application Ser. No. 60/108,277 which was filed Nov. 12, 1998.

FIELD OF THE INVENTION

This invention relates to television display systems and particularly to an apparatus for suppressing overshoots of kinescope be am current measurement pulses.

BACKGROUND OF THE INVENTION

Display systems for digital television receivers, including high definition television receivers, and computer or multi-media monitors may have one or more modes with horizontal scanning rates higher than (e.g., 2.14 times) the conventional 1H scanning rate in accordance with the conventional NTSC, PAL and SECAM video transmission standards. In such higher than normal scanning rate monitor/receiver display systems, an automatic kinescope bias (AKB) arrangement has a shorter cathode cut-off current measurement time period compared with that of display systems operating in accordance with the conventional standards. It is herein recognized that prior AKB arrangements may not operate properly in higher than normal scanning rate display systems for the following reasons.

AKB systems employ feedback to regulate the beam cut-off level of kinescopes. Typically, an AKB system generates beam cut-off test pulses that are applied to a kinescope cathode. One horizontal line (typically a line of the vertical interval) is used to measure the beam cut-off current of each gun of the color kinescope (or CRT). A cathode current sensor detects the actual beam cut-off current produced in response to the test pulse and produces a voltage pulse across a load resistance. The measurement voltage pulse across the load resistance is compared to a reference level during the measurement time period. The bias voltage for each CRT gun is then adjusted by the system to correct for errors in cut-off bias voltages.

The process of turning on and turning off each gun causes the kinescope capacitance to be charged and discharged, The result is that the red, green and blue AKB measurement pulses may exhibit overshoots on each transition that may interfere with accurate measurement of the pulse amplitudes and therefore interfere with the adjustment of the cut-off bias voltages.

The presence of such overshoots for normal 1H operation (i.e., standard horizontal scan rates) is not a significant problem because the AKB pulse measurement period can be relatively long compared to the width of the overshoots and because a relatively large capacitor may be placed across the load resistance because of the slower scanning rate. However, the AKB measurement period at higher than normal 1H scanning rates has a relatively limited duration. It has been found that using relatively large capacitor across the load resistance will tend to reduce the amplitude of the shoots but will also cause undesirable tilt or slope on each pulse. It is herein recognized that such pulse distortions (tilt or slope) can result in AKB pulse measurements errors in such higher than normal scan rate systems. More specifically, a non-constant amplitude of the pulse, as it is being compared to a reference, can cause the AKB system to change bias during the AKB period and to not adjust (or "servo") to a consistent level. Additionally, there may be color temperature errors or inconsistencies between the various scanning modes.

SUMMARY OF THE INVENTION

The present invention resides, in part, in the recognition of the heretofore unrecognized problem (discussed above) regarding the effect of high speed scanning on kinescope cathode current measurement pulses.

The present invention is directed to meeting the need for pulse correction apparatus in a display system for removing overshoots of kinescope beam current measurement pulses without significantly affecting the overall pulse amplitude.

Advantageously, the measurement pulse correction circuit of the present invention removes excessive cathode current measurement pulse overshoots (in either direction) without significantly affecting pulse amplitude. In a specific example of the invention herein described, a cathode current measurement pulse correction circuit has been added to an exemplary AKB arrangement. The correction circuit senses the overshoot and switches in a capacitor to suppress the shoot during the shoot time. The capacitor is switched out during the remainder of the pulse measurement time period. The AKB measurement pulses are not significantly modified except during the shoot time. It will be noted that a conventional level sensitive clipping circuit can not be used for this purpose because the level of each pulse can change, both with component tolerances and with color temperature adjustment. That is, the correct level of each pulse can not be predicted.

In addition to providing current measurement pulse correction in AKB systems, the invention also has use in other applications. As discussed later, for example, the pulse correction circuit of the present invention may be used in conjunction with an automatic white level or gain (drive) arrangement since automatic gain adjustment arrangements also measure cathode currents which are generated in response to test voltage pulses during an operation similar to that of AKB operation.

Pulse correction apparatus in accordance with the invention comprises cathode current sensing means (18) coupled to a cathode (K1) of a kinescope (24) and having an output (28) for providing a beam current measurement pulse (RP) during a beam current measurement interval and a load circuit (200) responsive to the measurement pulse for producing an output voltage pulse (RP) which may tend to exhibit an overshoot. Such overshoots are corrected by a pulse correction circuit (300) comprising a capacitor (Ca) coupled from the load circuit (200) to a source of reference potential (Gr) via a switch (Q300); and a control circuit (Ca, Ra, Rb), responsive to the presence of the overshoot, for closing the switch for a predetermined length of time and for opening the switch otherwise.

Advantageously, in exemplary applications of the invention herein described, the switch comprises a transistor of either the bipolar or field effect type providing the dual functions of both pulse suppression and providing threshold detection for the control circuit.

In a first illustrative embodiment of the invention, the switch comprises a bipolar transistor (Q300) having an emitter (E) coupled to the source of reference potential (Gr) and having a collector (C) AC coupled to the load circuit (200) via said first capacitor (Ca); and the control circuit comprises a second capacitor for AC coupling the load circuit to a base (B) of the bipolar transistor and a resistor (Ra) for DC coupling the base (B) to the source of reference potential (Gr).

In a further illustrative embodiment of the invention, the switch comprises a field effect transistor (Q300A) having a source (S) coupled to the source of reference potential (Gr) and having a drain (D) AC coupled to the load circuit (200) via the first capacitor (Ca); and the control circuit comprises a second capacitor (Cb) for AC coupling the load circuit to a gate of the field effect transistor (300A), a resistor (Ra) for DC coupling the gate (G) to the source of reference potential (Gr), and a threshold device (D1) coupled between the gate (G) and the drain (D) of the field effect transistor.

BRIEF DESCRIPTION OF THE DRAWING

The foregoing and further features of the invention are illustrated in the accompanying drawing, wherein like elements are denoted by like reference designators, and in which.

DETAILED DESCRIPTION

Figure 1:
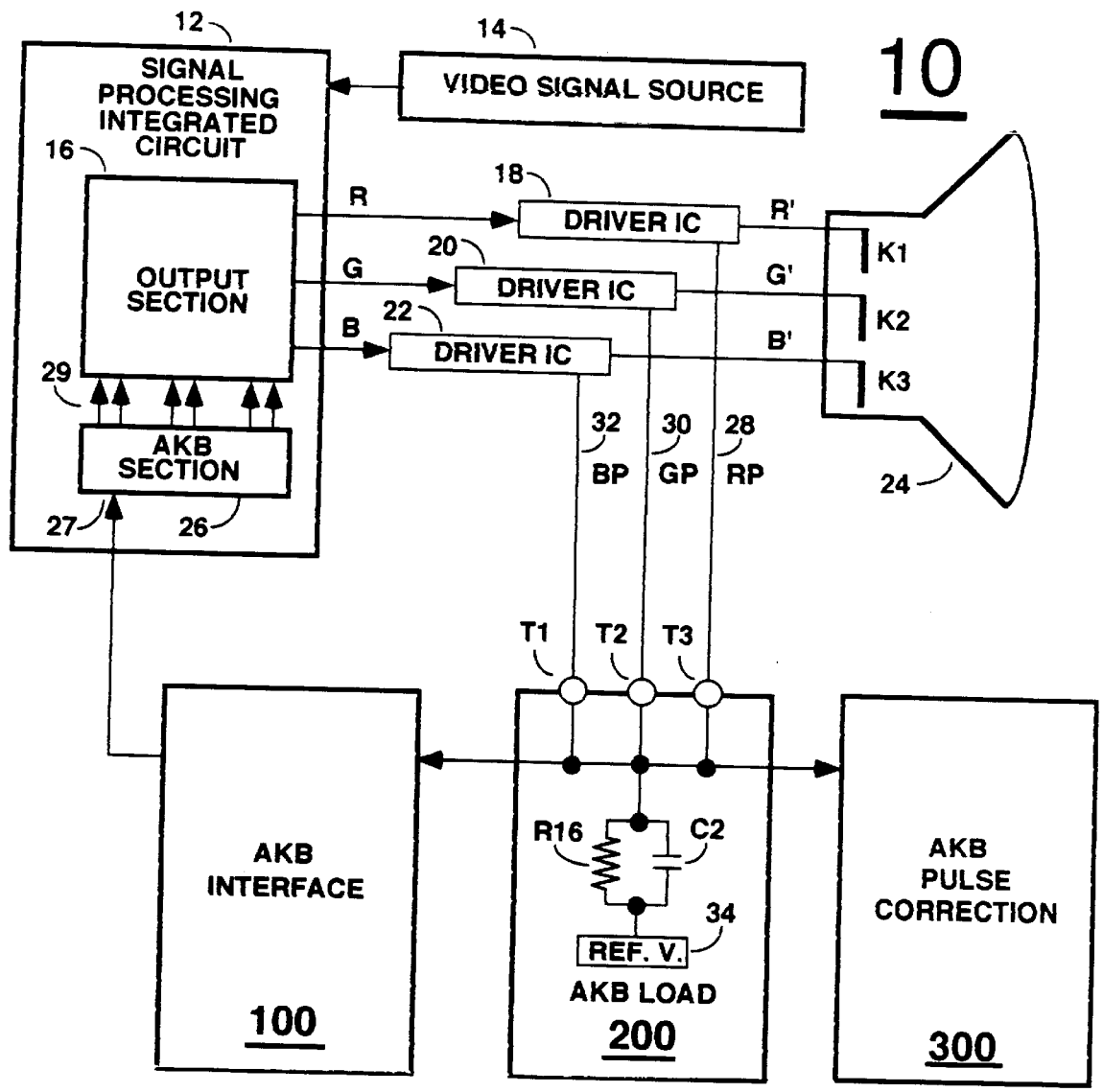
FIG. 1 is a block diagram, partially in schematic form, of a display system including a pulse correction circuit embodying the invention.

The television receiver/monitor 10 of FIG. 1 includes a signal processing integrated circuit 12 (herein after, "IC"), such as the Toshiba type TA1276N IC or the Philips type TDA4780 IC, which is coupled to a video signal source 14 for receiving a video signal for display and produces R, G, and B color signals in respective stages of an output section 16. The R, G and B signals are coupled to respective kinescope driver amplifiers 18, 20 and 22 which may comprise, for example, type TDA6120Q integrated circuits manufactured by Phillips. The amplified R, G, and B output signals of the driver ICs are coupled to respective cathodes K1, K2 and K3 of a kinescope 24. The signal processing IC 12 includes an AKB section(26) coupled to the output section 16 which produces AKB test voltage pulses at respective ones of the R, G and B outputs of the signal processing IC 12 during successive horizontal lines within or near the vertical blanking interval.

The timing for the AKB test pulses may be different depending on the operating mode of the receiver/monitor 10. For example, for NTSC operation, the AKB test pulses occur during lines 19, 20 and 21 for the R, G and B signals, respectively. For a computer VGA mode, the pulses may start about one line after the end of the vertical blanking interval, or within the beginning of the picture interval. Also, the duration of the vertical blanking interval is different for the different modes.

Normal video information is blanked during the generation of the AKB test pulses. The AKB test voltage pulses cause respective AKB measurement current pulses (RP, BP and GP) to be produced at respective cathode current sense outputs 28, 30 and 32 of the kinescope driver amplifiers 18, 20 and 22, respectively. The measurement current pulses correspond to respective cathode currents for cathodes K1, K2 and K3. The measurement current pulses occur in succession (i.e., one after another) and are coupled to respective input terminals T1, T2 and T3 of an AKB load 200 (outlined in phantom) where they are converted to AKB measurement voltage pulses by means of a common load resistor R16 in load 200 that is connected at one end thereof to terminals T1, T2 and T3 and at the other end thereof to a source of reference voltage 34. A filter capacitor C2 is coupled across the load resistor R16. The AKB measurement voltage pulses produced across load resistor R16 are coupled via an AKB interface circuit 100 to an input 27 of the AKB section of signal processing IC 12. The AKB section 26 compares the successively developed AKB measurement voltage pulses to a reference voltage and in response to the comparison develops bias voltages at outputs 29 for the R, G and B stages of the output section 16.

In accordance with the invention, an AKB measurement pulse correction circuit 300 is coupled to the AKB load circuit 200 to inhibit distortion of the measurement pulses, as will be described in detail below. It will be noted that depending on the type of signal processing IC and/or the kinescope driver IC which is employed in the display system 10, the AKB interface circuit 100 for assisting in the development of the AKB measurement voltage pulses may be employed, as is shown in FIG. 1. The interface circuit 100, however, may be not needed in certain applications where, for example, different driver or signal processing ICs are selected for use which do not require the signal conditioning provided by the interface circuit 100. In other words, the present invention may be practiced with or without the used of the interface circuit 100.

Figures 2A, 2B, 2C:
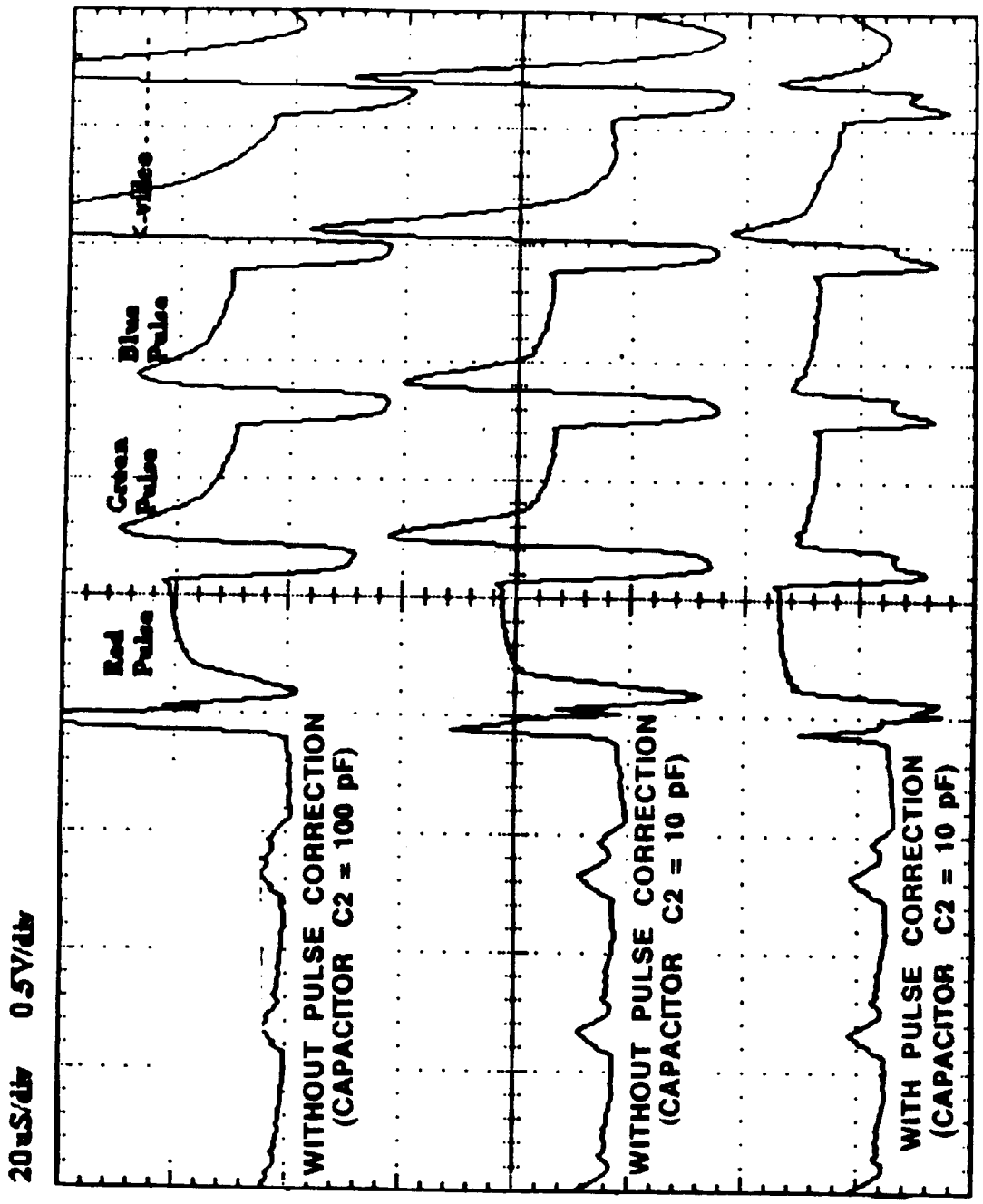
FIGS. 2A, 2B and 2C are waveform diagrams for illustrating certain aspects of the operation of the pulse correction circuit of FIG. 1.

The newly discovered problem to which the present invention is directed and the advantageous effects achieved by the invention are illustrated by the signal waveforms of FIGS. 2A, 2B and 2C. FIG. 2A shows; the R, G and B AKB pulse waveforms with the distortion caused by overshoots and filtering for the case where (i) correction circuit 300 is not connected; (ii) the filter capacitor C2 is of a relatively high value (e.g., 100 pF) and (iii) the scanning rate is substantially higher than the 1H rate of conventional NTSC, PAL or SECAM rates (e.g., 2.14 times the 1H rate). As shown, the AKB measurement voltage pulses (Red, Blue and Green) produced by load circuit 200 exhibit overshoots and a significant slope or tilt of the measurement pulses is apparent. As indicated in FIG. 2B, reducing the value of the filter capacitor C2 in load 200 by an order of magnitude from 100 pF to 10 pF results in pulses having less slope or tilt after the shoots, but increases overshoot amplitudes. The waveform of FIG. 2C indicates the advantageous effect of the present invention wherein pulse correction circuit 300 substantially reduces the amplitudes of the overshoots without otherwise significantly distorting the pulses (note particularly that shoots of either polarity (increasing or decreasing voltage) are reduced and there is little tilt or slope to the corrected pulses.

Figure 3:
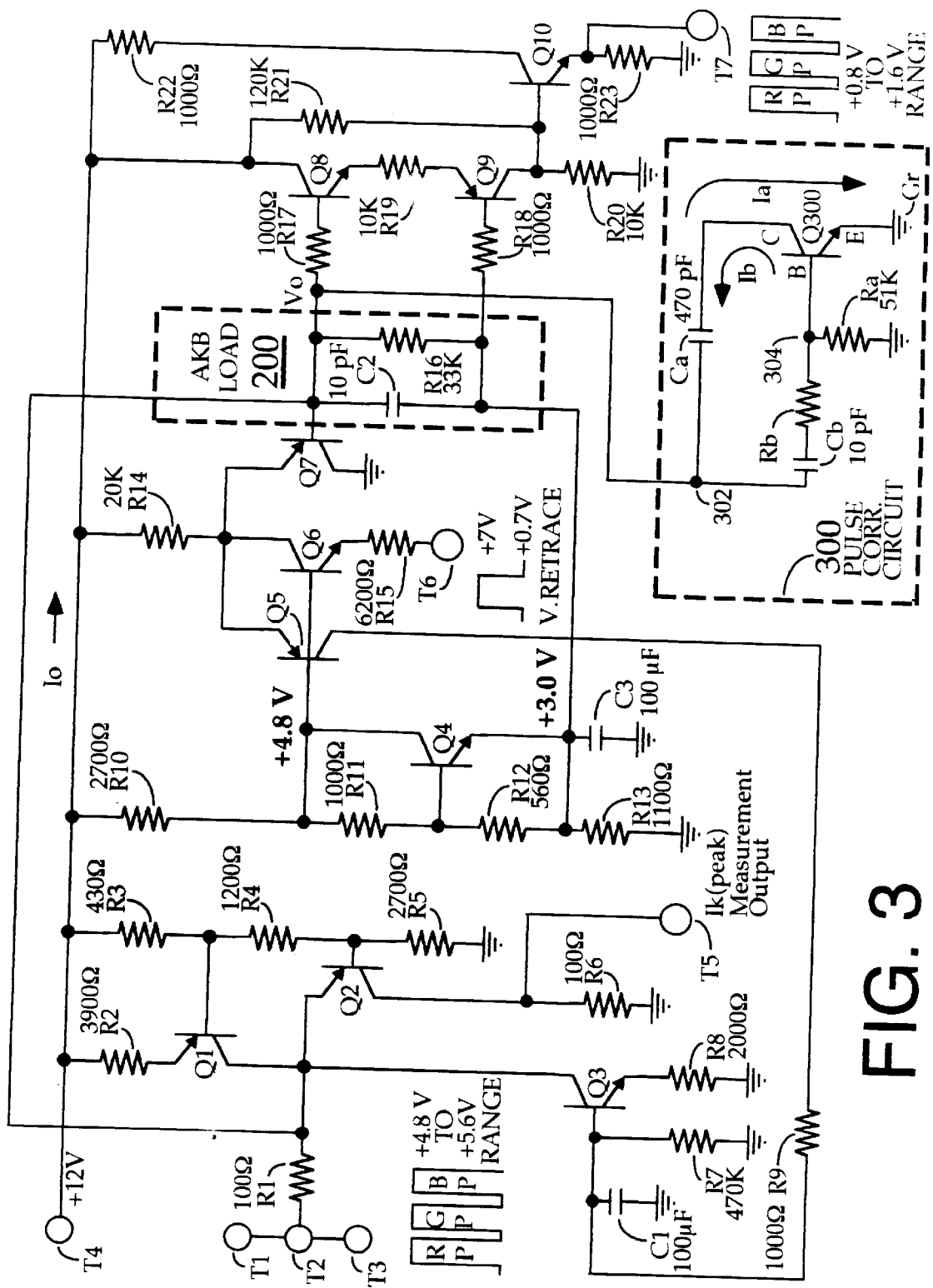
FIG. 3 is a detailed circuit diagram of portions of the apparatus of FIG. 1 including a pulse correction circuit according to the invention.

FIG. 3 shows, in schematic form (with exemplary element values) the AKB pulse correction circuit 300 embodying the invention, the AKB load 200 and the AKB interface 100. For purposes of illustration and explanation, the AKB load 200 and the AKB pulse correction circuit 300 are each outlined in phantom. The remainder of the circuitry comprises the AKB interface 100 (not outlined in phantom). As previously noted, depending on the type of kinescope driver and/or video processing IC used in the display system 10, the interface circuit 100 may or may not be employed. Details of the specific interface circuit 100 will be explained later.

Pulse correction circuit 300 comprises a bipolar transistor (Q300) having an emitter (E) coupled to a source of reference potential (Gr) and having a collector (C) AC coupled to the load circuit (200) via a first capacitor (Ca). A second capacitor Cb AC couples the load circuit to a base (B) of the bipolar transistor and a resistor (Ra) DC couples the base (B) to the source of reference potential (Gr). A further resistor Rb is coupled in series with capacitor Cb for adjustment of the turn-on threshold of the circuit.

In operation of the AKB pulse correction circuit 300 of FIG. 3, the transistor Q300 is normally non-conductive (off) and therefore has no effect on the AKB pulses produced across load 200. When an overshoot with a rising transition of more than a threshold voltage, here being the base-to-emitter conduction voltage of transistor Q300, occurs, the transistor will turn on in response to current supplied by capacitor Cb. As a result, capacitor Ca is coupled to ground through the conductive collector-emitter path of transistor Q300 and the amplitude of the overshoots are significantly limited. The threshold level for allowing rising amplitudes higher than the base conduction voltage can be adjusted by selecting a value for resistor Rb greater than zero Ohms. More specifically, resistors Ra and Rb form an attenuator. By increasing Rb the attenuation is increased and so the detection threshold (turn on of Q300) is increased. For example, if the threshold voltage of transistor Q300 is Vt volts and the value of Rb is selected to equal that of Ra, then the threshold will be multiplied by a factor of two.

The length of time that transistor Q300 will be turned on is determined by the time constant of the capacitor Cb and the values of resistors Ra and Rb. In accordance with an aspect of the invention, this time period is, selected to be about equal to the shoot time duration (see FIG. 2B). Because of this feature of the invention, shoot suppression occurs mainly during the shoot time and so the pulse correction circuit 300 does not degrade the pulse tops during the measurement time interval thereby providing tops that are relatively flat and exhibit little slope or tilt.

The value of capacitor Ca is not particularly critical. This capacitor blocks DC conduction which would otherwise alter the amplitude of the voltage pulses developed across load 200. It can conduct a current Ib (reverse conduction) during negative going shoots through the series connection of the collector-base junction of transistor Q300 and resistor Ra. This reverse conduction restores the voltage across the capacitor Ca so that transistor Q300 can produce collector current during the following positive going overshoot. As shown in FIG. 2C, this reverse conduction (via the base-collector junction) suppresses negative going shoots in addition to the positive going shoots suppressed during the time that transistor Q300 is turned on.

It will be further noted that there is no DC current path at all in pulse correction circuit 300 which would remove DC current from the load circuit 200. More specifically, the collector of transistor Q300 is AC coupled to the load 200 by capacitor Ca and the base of transistor Q300 is also AC coupled to load 200 by capacitor Cb. These features of the invention ensure that there is no net reduction in the tops of the pulses except for the time period when shoots are present and this time period is fixed by the time constant determined by Cb, Ra and Rb. Thus, pulse tops remain flat without tilt or slope.

Figure 4:
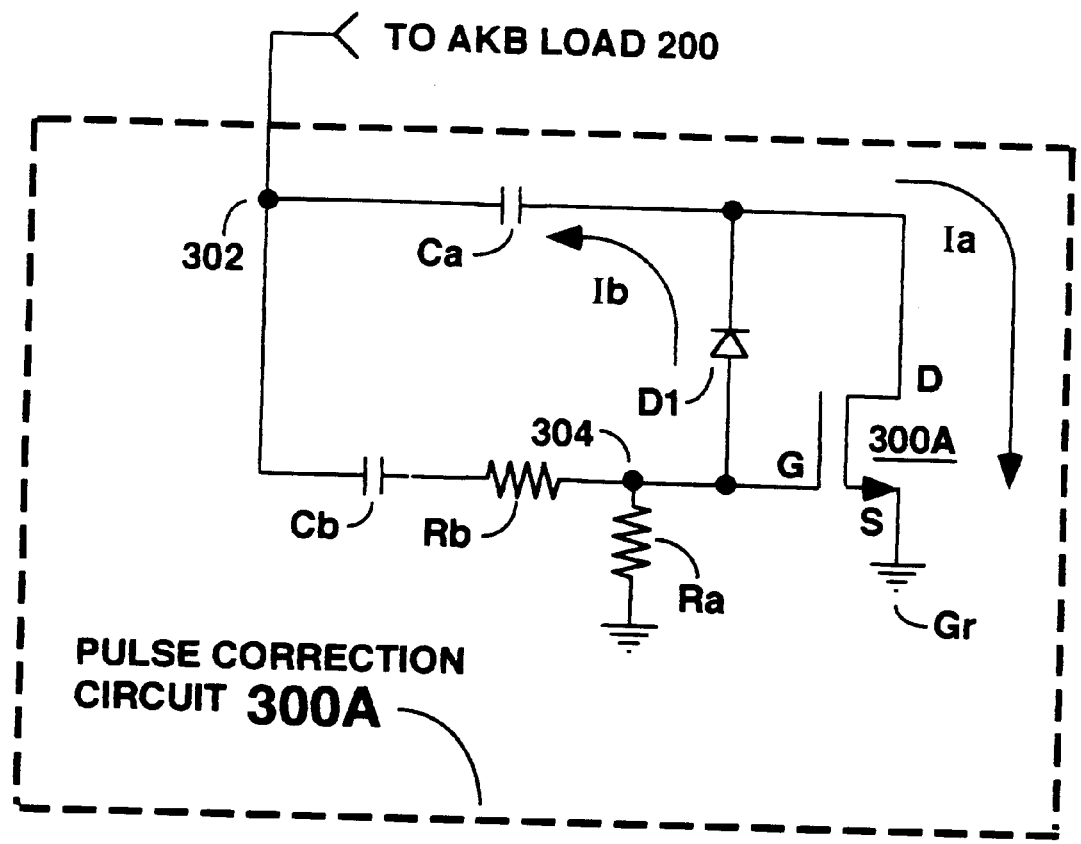
FIG. 4 is a circuit diagram illustrating a modification of the pulse correction circuit embodying the invention.

FIG. 4 illustrates a modification of the correction circuit 300 of FIG. 3 in which the bipolar transistor Q300 is replaced by a field effect transistor Q300A. The source, gate and drain of FET 300A are connected as the emitter, base and collector of Q300 in FIG. 3. The modification further includes the addition of a diode D1 connected at the anode thereof to the gate of transistor Q300A and connected at the cathode thereof to the drain of transistor Q300A. The function of the diode D1 is to provide a DC path through resistor Ra and diode D1 to capacitor Ca. This corresponds in function to the diode provided by the collector to base junction of the bipolar transistor Q300. Specifically, negative going shoots forward bias the diode D1 and so are suppressed.

While the measurement pulse correction circuit has been described in terms of an AKB arrangement, it is noted that such a pulse correction circuit may be useful in conjunction with an automatic white level or gain (drive) arrangement since automatic gain adjustment arrangements also measure cathode currents which are generated in response to test voltage pulses during an operation similar to that of the AKB operation. Such automatic gain adjustment arrangements are often included in the same signal processing IC as an AKB arrangement and typically utilize the same cathode current sensing and measurement pulse load circuits. The Philips TDA4680 signal processing IC includes both AKB and automatic drive adjustment provisions.

Further, while the measurement pulse correction circuit of the present invention may be utilized in connection with an automatic drive adjustment arrangement, the following is noted. The need to remove an overshoot from a measurement pulse decreases as the sample pulse current increases. Measurement pulse overshoots are a significant problem for low current measurements such as for AKB measurements, but may not be as significant a problem for higher current measurements.

The AKB interface circuit 100 shown in FIG. 3 will now be described in detail. It will be noted that the interface circuit 100 is the subject matter of U.S. Provisional Application Ser. No. 60/094,338 filed Jul. 7, 1998.

By way of background regarding the interface circuit 100, digital, including high definition television receivers and computer or multimedia monitors require relatively wide bandwidth kinescope drivers. For example, the monitor/receiver 10 of FIG. 1 includes Philips type TDA6120Q kinescope drivers ICs 18, 20 and 22 (three are used, one for each of the R, G and B signals) because of the IC's relatively wide large-signal bandwidth. However, it has been found that a kinescope driver IC, such as the Philips TDA6120Q, may be difficult to interface with the AKB section of a conventional video signal processing IC, such as the Toshiba TA1276N or Philips TDA4780, because of the characteristics and restrictions of the current measurement output of the kinescope driver IC. Philips Application Note AN96073 for the TDA6120Q kinescope driver IC sets forth certain characteristics and/or restrictions. Of these, the following are significant:

(i) The nominal offset current of the IC is 20 $\mu$A. Unfortunately, the nominal offset current is high considering that the desired picture tube cut-off current is less than 20 $\mu$A; and (ii) The possible range in offset current can be from −40 $\mu$A to +120 $\mu$A. This becomes a very high value for three amplifiers in parallel as illustrated. However, this offset current is constant, and if the dynamic range of the AKB arrangement (referred to in the aforementioned Application Note as "Automatic Black-current Stabilization or AIBS arrangement) is large enough, this offset current will be seen as a large leakage current. If the offset current can be stabilized, the ABS (or AKB) loop will work satisfactorily.

(iii) The current measurement output of the TDA6120Q is reliable only if the voltage at which the current is measured is between 4 and 20 volts. The Toshiba TA1276N, the Philips TDA4780 and known similar video processing ICs are designed to receive a lower voltage level at the AKB inputs thereof.

As a brief overview of the interface circuit 100, the overall leakage current of the three summed AKB current sense outputs 28, 30 and 32 of the three TDA6120Q kinescope driver ICs 18, 20 and 22 (which are connected at terminals T1, T2 and T3 of the load 200) is compensated by a servo-mechanism. The servo-mechanism is a feedback circuit comprising a keyed comparator (Q5, Q6 and Q7) which receives the load voltage, Vo, compares it with a reference level during vertical retrace and controls a differential current source (Q1, Q3) comprised of a fixed current source Q1 and a variable current source Q3 which feeds back a net leakage correction current Io to the load circuit 200. By this means leakage current are corrected which enables a DC level translation and scaling to be made between the kinescope driver ICs and the signal processing IC.

The DC level translation and scaling provides an acceptable DC signal level match between the kinescope driver IC's and the video processor IC by shifting the DC level of the load voltage and scaling the amplitude of the load voltage appropriately. The DC level shift is provided by transistor Q4 in a reference voltage source which applies a 3.0 voltage reference to the load circuit 200 and the scaling is provided by a pair of transistors Q8 and Q9 which sense the voltage across load 200 and generate in a load resistor R20 a scaled version of the load voltage which is coupled via an emitter follower Q10 to the input 27 of the AKB section 26 of IC 12.

Advantageously, the AKB interface circuit 100 makes it possible to utilize signal processing ICs, such as the Toshiba TA1276N or the Philips TDA4780 with kinescope driver ICs, such as the Philips type TDA6120Q.

An embodiment of the AKB interface circuit is described below, by way of example, with reference to the Toshiba TA1276N video processing IC and the Philips TDA6120Q kinescope driver IC. The TA1276N signal processing IC expects the nominal AKB pulse amplitude to be 1.6 volts. The AKB interface circuit detects the AKB sense pulses at a level ranging from 4.8 to 5.6 volts. That voltage range is within the accurate measurement output range of the Philips TDA6120Q kinescope driver IC. The reference level for the pulses (+4.8 VDC) is maintained by a keyed servo-mechanism (i.e., a feedback regulator) that compares the signal from the kinescope ICs to a 4.8 VDC reference and modifies bias on a current source to maintain that nominal voltage level, independent of the offset current which can range from −120 $\mu$A to +360 $\mu$A for the three driver ICs. A DC level shift and scaling circuit is used to translate the pulses at the 4.8 to 5.6 volt level to a 0.8 to 1.6 volt level. The AKB arrangement in the TA1276N will adjust the R, G and B bias voltages to maintain the AKB measurement pulses at a nominal level of 1.6 volts.

Considering now the specific details of the interface circuit 100 in FIG. 3, the current measurement pulses RP, GP and BP applied to the commonly connected input terminals T1, T2 and T3 are summed and applied via a relatively small surge current limiting resistor R1 to AKB load 200 which produces a load voltage Vo across the load resistor R16 of load 200. The load voltage Vo is applied to a leakage correction circuit or "servo-mechanism" comprising transistors Q1, Q3, Q5, Q6 and Q7. The transistors Q5–Q7 form a keyed comparator which compares the load voltage Vo with a fixed reference voltage (+4.8V) provided by a reference voltage circuit comprising transistor Q4 (described below). The keyed comparator is formed by coupling the emitters of Q5 and Q7 and the collector of Q6 to a supply terminal T4, coupling the base of Q5 to a reference voltage source (+4.8v), coupling the base of Q7 to the output of load 200 and applying keying pulses during vertical retrace via resistor R15 to the emitter of Q6. The keying pulses at terminal T6 may be provided by suitable deflection timing circuits. The collector of Q7 is grounded and the comparator output is taken from the collector of Q5. In operation, the keyed comparator maintains the detection reference at 4.8 volts by modifying the pull down current source bias (Q3) during the vertical retrace period when there is no signal on the current sense connection from the kinescope driver ICs. Transistor Q6 is saturated preventing conduction of Q5 and Q7 except during the vertical keying pulse. Capacitor C1 is charged by collector current from Q5 and discharged by resistor R7. The bias for the variable current source transistor Q3 is essentially constant or changes very slowly because capacitor C1 is relatively large and the charge and discharge currents for C1 are relatively small. Thus, there are no abrupt changes in the Q3 current due to operation of the keyed comparator Q5–Q7.

The keyed comparator output (collector of Q5) is coupled to a variable current source Q3 and a smoothing or integrating capacitor C1 which produces a smoothed variable output current that is summed with a fixed output current provided by a fixed current source Q1. The fixed current source Q1 is coupled at the emitter thereof to supply terminal T4 and receives base bias from a potential divider comprising resistors R3–R5. The variable current source comprises transistor Q3 having an emitter resistor R8 coupled to ground and a base coupled to ground via a smoothing capacitor C1 and a resistor R7 for providing a discharge path for the capacitor C1 and thus sets the capacitor discharge time constant. The input to the variable current source is provided by a resistor R9 that couples the output (collector Q5) of the keyed current source to the base of the variable current source Q1 and the integrating or smoothing capacitor C1.

The difference of the two currents provided by the fixed current source Q1 and the variable current source Q2, Io, is fed back to the load circuit for correcting leakage currents. If, for example, the kinescope leakage currents tend to increase, the keyed comparator increases the charge on capacitor C1 thereby increasing the current conducted by transistor Q3. Since this current is subtracted from that provided by the fixed current source Q1, the net output current Io to load 200 will decrease thus tending to reduce and stabilize the load voltage at the reference voltage level of +4.8 volts provided by the collector of a reference voltage transistor Q4. Conversely, if leakage currents decrease, the load voltage will tend to decrease also and the keyed comparator Q5–Q7 will decrease the current provided by the variable current source Q3. As a result, the difference between the variable current source Q3 and the fixed current source Q1 will increase thus sending an increasing net output current Io to load 200 thus counteracting the decreased leakage current and stabilizing the load voltage at the reference level of 4.8 volts provided by the reference voltage supply transistor Q4. It will be noted that, in this example of the invention, the pull-up current source Q1 needs to provides about 135 $\mu$A. The value needs to be at least 120 $\mu$A, the maximum negative offset current for the three kinescope drivers used in the illustrated embodiment of the invention. As to the pull-down current source Q3, the output current should be variable over a range of, illustratively, 0–500 mA. The value needs to be at least 360 µA, positive offset current plus the 135 µA of the pull-up current source Q1.

A further feature of interface 100 comprises a voltage clamp transistor Q2 that prevents the input signal (Vo across load 200) from exceeding +8.2 volts as the beam current increases to maximum during trace intervals. This is implemented by connecting the emitter of PNP transistor Q2 to the load 200, coupling the collector there to an output terminal T5 and to ground via a load resistor R6 and biasing the base of transistor by a potential divider comprising resistors R3–R5 connected between the supply terminal T4 and ground. The common connection of resistors R3 and R4 provides bias for the base of the fixed current source transistor Q1 and the common connection of resistors R4 and R5 provides bias for the base of the limiter or clamp transistor Q2. The load resistor R6 and output terminal T5, provide an output voltage when the clamp or limiting transistor Q2 turns on due to excessive load voltage. Although not used in this example of the invention, this output may be used for providing peak beam current limiting, if desired, as described later.

Level shifting and scaling of the load voltage developed across load resistor R16 is provided by transistors Q8 and Q9 which are coupled together at the emitters thereof by resistor R19 and coupled at the bases thereof to the load 200 via respective base coupling resistors R17 and R18. This generates a collector current for Q9 across resistor R20 proportional to the current through load resistor R16. Resistor R21 is a pull up resistor coupled to the base of Q10 and to R20 to shift the pulse reference from 0 volts to +0.8 volts. This reduces the pulse amplitude requirement from the interface circuit to 0.8 volts peak to peak since the TA1276N signal processing IC is designed to receive a nominal level of 1.6 volts relative to ground.

DC reference voltages of +3.0 volts for the load 200 and of +4.8 volts for the reference input (base of Q5) of the keyed comparator Q5–Q7 are provided by transistor Q4 connected in a "Vbe multiplier" configuration. Specifically, Q4 is coupled via collector and emitter resistors R10 and R13 to the supply terminal T4 and ground, respectively, and a potential divider comprising resistors R11 and R2 is coupled to apply the collector-emitter voltage of Q4 to its base. Resistors R11 and R12 feed back about one-third of the collector emitter voltage to Q4 and so the net collector emitter voltage is regulated at about three times the base-emitter threshold voltage (i.e., 3Vbe) of Q4) which equals about 1.8 volts (i.e., 3 times 0.6 volts Vbe). The emitter voltage of Q4 is elevated or shifted to +3.0 volts by means of Resistors R10 coupling the supply voltage (+12V) to the collector and R13 coupling the emitter to ground. A feature of this reference voltage supply is that variations in the Vbe thereof provides temperature compensation for variations in the Vbe of transistors Q8, Q9 and Q10.

As previously mentioned, resistor R6 coupled to output terminal T5 provides a measure of peak cathode current when transistor Q2 is limiting or clamping to load voltage to about +8 volts. This may be used for peak beam current limiting, if desired. Peak beam currents will be large compared to cathode cut-off current and will develop a voltage across R6 equal to the current times the resistance, that is, 6 mA of cathode current would produce 0.6 volt at output T5 when R6 is 100 Ohms. This developed voltage can be used to limit the kinescope driver signal such that peak cathode current can not increase above a particular level. For that purpose the voltage developed across resistor R6 could be coupled to the contrast control section of the signal processing IC, for example or to some other suitable point such as the kinescope driver amplifiers. The peak beam current limiting function is particularly useful in projection display systems.

In a projection display system, three separate kinescopes are utilized. In that case, an AKB interface circuit, such as that described above can be provided for each of the three kinescope drive ICs associated with respective ones of the three separate kinescopes. The three AKB interface circuits can be located together with respective kinescope drive IC's on respective kinescope drive boards mounted on respective kinescope socket connectors. In such an arrangement, three transistors corresponding to transistor Q9 would be part of respective AKB interface circuits located on respective kinescope driver boards and the buffer transistor Q10 and associated base resistors would be located on a fourth board and coupled to receive collector current signals from Q9 of each of the three kinescope drive boards.

What is claimed is:

1. Pulse correction apparatus in a display system, comprising:
    cathode current sensing means coupled to a cathode of a kinescope and having an output for providing a beam current measurement pulse during a beam current measurement interval;
    a load circuit responsive to the measurement pulse for producing an output voltage pulse which may tend to exhibit an overshoot; and a pulse correction circuit comprising:
        a first capacitor having a first electrode coupled to the load circuit and a second electrode coupled to a source of reference potential via a switch; and
        a control circuit, responsive to the presence of said overshoot, for closing said switch for a predetermined length of time and for opening said switch otherwise, whereby said pulse correction circuit reduces said overshoot of said output voltage pulse when said switch is closed.

2. Apparatus as recited in claim 1 wherein:
    said switch comprises a bi-polar transistor having a collector coupled via said first capacitor to said load circuit, having an emitter coupled to said source of reference potential and having a base coupled to an output of said control circuit.

3. Apparatus as recited in claim 2 wherein said control circuit comprises:
    a second capacitor coupled between said load and said base of said bi-polar transistor and a resistor coupled between said base of said bi-polar transistor and said source of reference potential.

4. Apparatus as recited in claim 3, further comprising:
    a further resistor coupled in series with said second capacitor for controlling a threshold level at which said bipolar transistor conducts.

5. Apparatus as recited in claim 1 wherein:
    said source comprises first, second and third kinescope driver amplifiers having respective outputs for providing first, second and third sequential beam current measurement pulses during respective first, second and third measurement intervals; and
    said load circuit comprises a common resistor to which said first, second and third beam current measurement pulses are applied for correction by said pulse correction circuit.

6. Apparatus as recited in claim 1 wherein said switch comprises:

a field-effect transistor having a drain coupled via said first capacitor to said load circuit, having a source coupled to said source of reference potential and having a gate coupled to an output of said control circuit; and a diode having an anode coupled to said gate and having a cathode coupled to said drain.

7. Apparatus as recited in claim 6 wherein said control circuit comprises:

a second capacitor coupled between said load and said gate of said field effect transistor and a resistor coupled between said gate of said field effect transistor and said source of reference potential.

8. Apparatus as recited in claim 7, further comprising:

a further resistor coupled in series with said second capacitor for controlling a threshold level at which said field effect transistor conducts.

9. Apparatus as recited in claim 1 wherein:

said switch comprises a bipolar transistor having an emitter coupled to said source of reference potential and having a collector AC coupled to said load circuit via said first capacitor; and wherein said control circuit comprises a second capacitor for AC coupling said load circuit to a base of said bipolar transistor and a resistor for DC coupling said base to said source of reference potential.

10. Apparatus as recited in claim 1 wherein:

said switch comprises a field effect transistor having a source coupled to said source of reference potential and having a drain AC coupled to said load circuit via said first capacitor; and wherein said control circuit comprises a second capacitor for AC coupling said load circuit to a gate of said field effect transistor, a resistor for DC coupling said gate to said source of reference potential, and a threshold device coupled between said gate and said drain of said field effect transistor.

* * * * *